United States Patent
Navoa et al.

(10) Patent No.: US 12,164,212 B2
(45) Date of Patent: Dec. 10, 2024

(54) CAMERA LENS PROTECTOR WITH IMPACT ABSORBING FEATURE

(71) Applicant: FELLOWES MOBILE LLC, Itasca, IL (US)

(72) Inventors: Keith Navoa, Wood Dale, IL (US); Garrett Chou, Northbrook, IL (US)

(73) Assignee: Fellowes Mobile LLC, Itasca, IL (US)

( * ) Notice: Subject to any disclaimer, the term of this patent is extended or adjusted under 35 U.S.C. 154(b) by 0 days.

(21) Appl. No.: 18/397,734

(22) Filed: Dec. 27, 2023

(65) Prior Publication Data

US 2024/0310695 A1    Sep. 19, 2024

Related U.S. Application Data

(60) Provisional application No. 63/452,145, filed on Mar. 14, 2023.

(51) Int. Cl.
*G03B 11/04* (2021.01)
*G03B 30/00* (2021.01)

(52) U.S. Cl.
CPC ............ *G03B 11/041* (2013.01); *G03B 30/00* (2021.01)

(58) Field of Classification Search
CPC ............................... G03B 11/041; G03B 30/00
See application file for complete search history.

(56) References Cited

U.S. PATENT DOCUMENTS

| 9,001,176 B2 * | 4/2015 | Springer ............. | H04M 1/0264 |
| | | | 348/14.02 |
| 10,524,552 B2 * | 1/2020 | Okada .................. | H04B 1/3888 |
| 2014/0333831 A1 * | 11/2014 | Oh ......................... | H04M 1/185 |
| | | | 348/376 |

FOREIGN PATENT DOCUMENTS

| CN | 203892932 U | * | 10/2014 | |
| CN | 107367888 A | * | 11/2017 | ........... G03B 17/568 |
| TW | M594705 U | * | 5/2020 | ............. G03B 11/00 |

OTHER PUBLICATIONS

Casetify. "Amazon.Com: Casetify Camera Lens Protector for Iphone 14 Pro / . . ." Amazon, Aug. 12, 2022, www.amazon.com/CASETiFY-Camera-Lens-Protector-iPhone/dp/B0B9H3NP85. (Year: 2022).*

(Continued)

*Primary Examiner* — Clayton E. LaBalle
*Assistant Examiner* — Diana Hancock
(74) *Attorney, Agent, or Firm* — Wood, Phillips, Katz, Clark & Mortimer

(57) ABSTRACT

A laminated camera protector for a portable electronic device, the protector including adhesive layers to position the glass layer of the screen protector within 0.1 mm of the lens surface to reduce or eliminate flaring from a flash. The protector may further include a light isolating insert axially aligned with the camera flash.

16 Claims, 9 Drawing Sheets

(56) References Cited

OTHER PUBLICATIONS

Tensea. "Tensea [2Pack] Compatible iphone 11 Pro/iPhone 11 Pro Max Camera Lens Protectors, Aviation Aluminum Rear Cover and Tempered Glass Film Back Screen Protectors, 2 Pack (Midnight Green)." Amazon, Jan. 16, 2020, www.amazon.com/Tensea-Compatible-protectors-aviation-aluminum/dp/B083XJLKGB. (Year: 2020).*
Tensea. "Tensea [3Pcs] Camera Screen Protector Compatible with iPhone 12 Pro 6.1 Inch, Tempered Glass Camera Lens Protector, HD Clear, Full Edge to Edge Cover, Case Friendly (3)." Amazon, Sep. 10, 2020, www.amazon.com/tensea-protector-compatible-tempered-friendly/dp/B08N4KHSZ8. (Year: 2020).*
Casetify Camera Lens (Year: 2022).*
Tensea Camera Screen Protector (Year: 2020).*
Tensea Camera Lens Protector (Year: 2020).*

\* cited by examiner

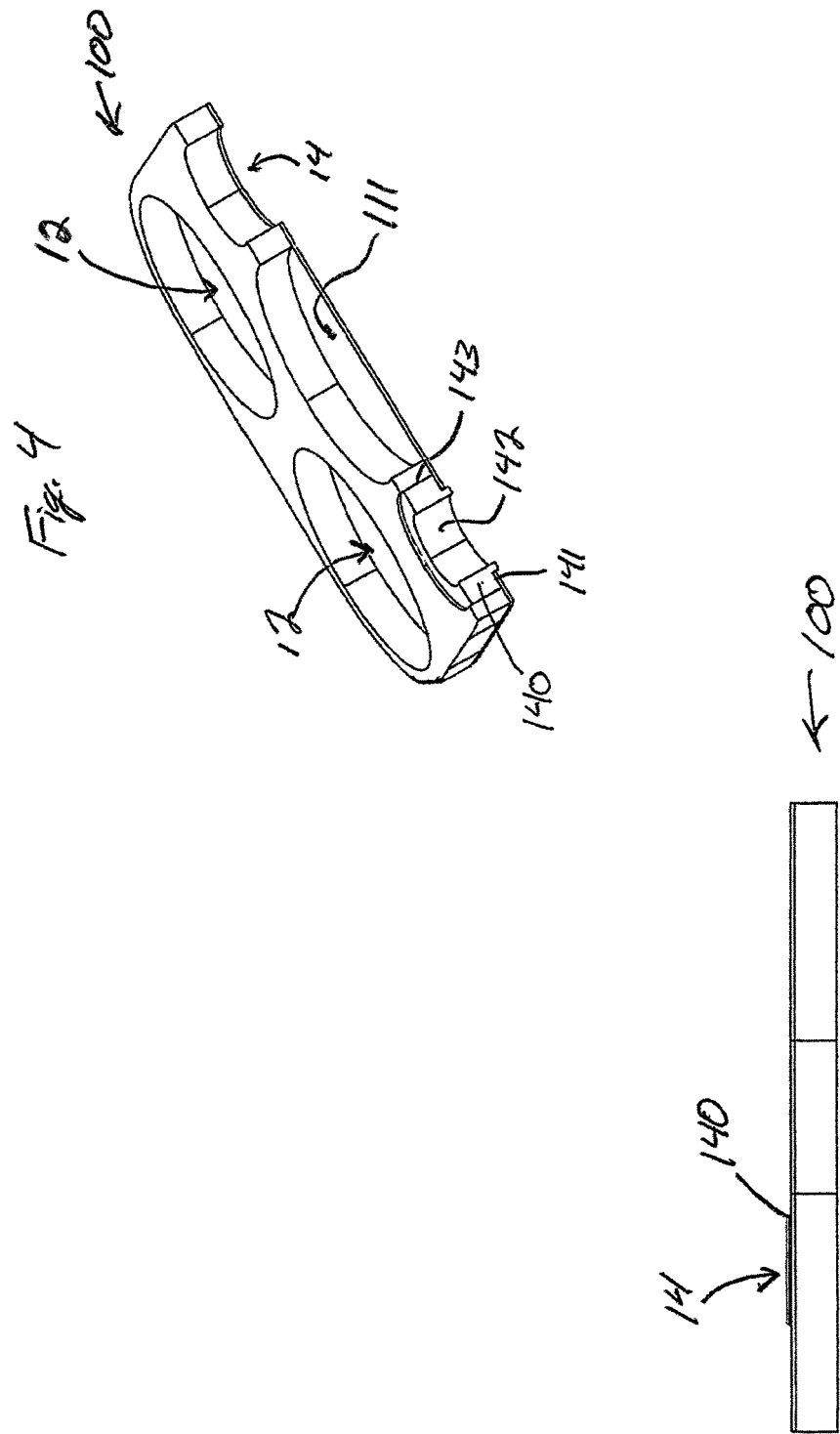

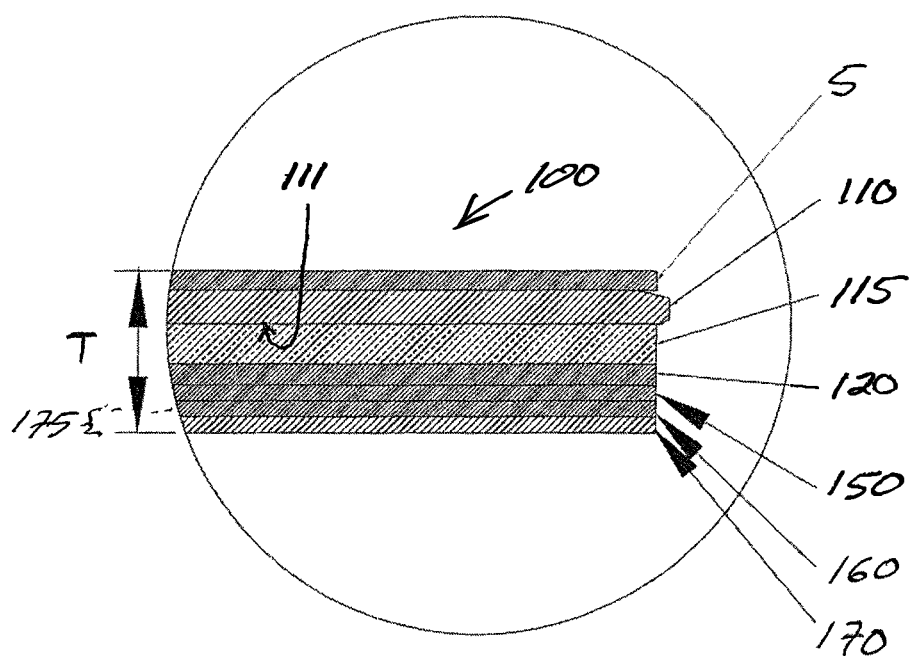

CAMERA LENS PROTECTOR WITH IMPACT ABSORBING FEATURE

BACKGROUND OF THE INVENTION

Field of the Invention

The invention described herein is an impact resistant camera protector for use with cameras and lenses of mobile phones, tablets and other devices with cameras. Such applicable products can be generally referred to as portable electronic devices. The protector may be adhered to the area around the lens or lenses of the device. The camera protector includes features to reduce or eliminate flaring and other optical effects from a camera flash.

Background Art

Protectors for the lens of a smartphone camera have existed in the prior art. Some prior art examples are circular glass covers or panels that are adhesively attached to the mobile device in an area immediately adjacent to the circular lens. Other examples include adhesive glass panels that cover or protect all of the lenses. Such multi-lens panels may also cover sensors and flashes. Such panels often cause flares to appear in the photographs, as light from the flash is transmitted within the panel to the imaging sensor of the camera. The judicious layup and spacing of the present invention minimizes, reduces, or eliminates the flares inherent in the prior art.

SUMMARY OF THE INVENTION

The invention described in the most general sense is an impact resistant camera protector product. The invention can be a piece of tempered glass designed to be dimensionally similar to the camera bump/feature of a mobile phone or other electronic device. The protector may be curved, shaped, and have receivers, holes, or apertures to accommodate the lenses sensors, and flash of the device. The invention is adhered to the back surface around the camera lenses or other portion of the electronic device by means of adhesive that is permanently affixed to the protector glass that creates a strong, but removable, bond to the electronic device camera surface.

Newer mobile devices feature raised camera bumps and lenses, which expose the camera modules and components to higher risk of damage from falls, scratches, and other damage. The camera protector serves as a robust but replaceable sacrificial exterior layer to prevent damage to the electronic device's camera unit, including the lenses, sensors, and flash. The replaceable protector would be shaped accordingly to fit over the camera unit, without interfering with lens or flash modules. The protector serves as a barrier preventing scratching or other aesthetic damage to the device's camera. It also is purported to reduce the likelihood of the device camera from suffering impact related damage during a drop or other impact event.

The invention may add a TPU or adhesive permanently affixed to the camera protector display glass. This additional layer enhances the impact protection offered by the protector by providing a cushioning, shock absorbent layer. In the event of the glass failing/shattering, the broken component is safer to handle through improved containment of the fractured glass fragments, which remain bonded to the TPU and glue layers as opposed to separating/scattering.

Additionally, the camera protector includes light isolating features around the camera apertures for lenses, flashes and sensors that provide improvements in photography performance over existing camera glass solutions. These features eliminate lens flare, vignettes, and overexposure. Apertures utilizing isolating features can include lenses, flash, and microphones. Light isolation is created in a number of ways, by painting or tinting different portions of the glass, by using a plastic PC flash isolator or light isolating insert about the aperture in the protector for the camera flash or additionally or separately using an insert about the lens barrel of the camera, or by selecting the thickness of the layers or the spacing of the layers from each other or from the lens or flash. It is preferred that the light isolating insert extend above the glass or polymer layer of the protector.

The invention described herein includes a layered or laminated structure of materials including tempered glass and is designed to be dimensionally similar to the camera bump/feature of a mobile phone or other electronic device. The overlays protect the camera lenses, sensors, and other components from impacts, scratches, and the like. The protector of the invention may include a laminate of multiple layers of glass, plastics, and adhesives to provide optical clarity in regions overlying a lens or sensor, but may also include areas and structures of opacity to limit the transmission of light. It is preferred that the adhesive have a visible light transmission of at least 93%. The protector of the invention may also include voids or apertures that allow passage or communication from one face or surface of the layer to another face or surface of the layer.

The overlays or layers protect the camera components from impacts by providing a cushion and in the case of an impact that is severe enough to break the glass of the protector, lens, or camera bump, may contain the glass within the laminate. The layers of the laminate may include tempered glass, optically clear adhesive, thermoplastic polyurethane, UV printing, and double sided or single sided adhesives, but such a recitation of layers is not limiting.

The adhesives used in the layers of the protector preferably have properties that allow some compression and rebound. Such compression and rebound allows the adhesives to act as cushioning elements. Additionally, the adhesive layers adhesive selection, as well as the thickness of the adhesive are important for placing the protector layer surface facing a lens of the camera to be less than 0.1 mm from the opposing lens surface.

If the adhesive layers are too thick, or rebound too much when compressed during application of the protector to the camera bump, the resulting distance of the protector layer surface opposing the lens surface may be greater than 0.1 mm, which is sub-optimal and may result in flaring and light transmission from the flash. If adhesive layers are too thin or compress too much, the protector layer surface opposing the lens surface will contact the lens surface and prevent the adhesive from adhering correctly to the camera bump. Depending upon the embodiment and properties desired, the layer of the protector opposing the lens surface may be the TPU layer, the glass layer, or any other layer. In the most preferred embodiment, the glass layer has a surface opposing the lens surface, the surfaces being within 0.1 mm of each other when the protector is mounted on the camera bump and the rebound of the adhesive has reached a resting or nominal level. One skilled in the art will recognize that the height of a lens or lens barrel above the camera bump of a phone may vary, thus the exact thicknesses of the laminates for any particular model of phone may vary. However, the thicknesses of the laminates, particularly the adhesives and the adhesives properties must be taken into account such that the adhesives do not compress so much during the mounting process so that the glass layer contacts the uppermost lens surface, and does not rebound to a resting or nominal position so much to be beyond 0.1 mm from the uppermost lens surface. Thus the adhesive layers that exist once the release liner is removed should not compress and rebound any more than 0.1 mm.

The layers may be coextensive with each other, or they may overlie portions of the layers above or below, or may include gaps within a particular layer. In some embodiments, it is preferable to have the glass layer extend slightly beyond the other layers at the perimeter. In other embodiments, it is preferable to have the glue layers not extend to any edge of the glass layer. In other embodiments, a layer may include a plurality of components or materials. In most embodiments, it is preferred that the layer of tempered glass is dimensionally similar to the camera bump it protects, but such construction is not necessary for the invention.

The thicknesses of each layer, as well as the schedule of the layup may vary within the scope of the invention. The protector may be planar, curved, shaped, and include apertures or holes to accommodate a lens or a plurality of lenses, sensors, or lighting devices such as a camera flash. The protector is adhered to the display glass, camera, or housing of the electronic device by means of an adhesive that is permanently affixed to the protector glass that creates a strong, but removable, bond to the electronic device camera surface.

The invention described can be made to be clear or opaque in aesthetic. When the product is clear it improves the cosmetics when applied to a mobile device. When the product is opaque in areas that are not over a lens or sensor or other feature requiring visual clarity, the product may have improved anti-flare characteristics. In any embodiment, the camera flash function is still functional for providing illumination of the photo subject, but the protector prevents pictures from overexposure, vignettes, and lens flares, as may occur with the protectors of the prior art.

In other aspects, the invention features an impact layer specifically for absorbing impact energy to the protector. This ability further protects the lenses of the portable electronic device, as well as portable electronic device itself, as less of the force is transmitted to the lenses and device.

In one form, the invention is directed to a protector for a camera of a portable electronic device. The protector includes a lamination of a plurality of layers. The layers include a layer of impact absorbing optically clear material, a glass layer, a first layer of layer of optically clear adhesive, an acrylic layer, and a second layer of optically clear adhesive. The layers each include at least one aperture aligned to allow communication through the lamination from a first side to a second side, and further include at least one light isolating member within at least one aperture of at least one layer.

In one form, the light isolating member is an insert within an aperture.

In one form, the insert is in the aperture of each layer.

In one form, the insert extends above the impact absorbing optically clear layer by 0.1 mm.

In one form, the insert includes an inwardly extending flange.

In one form, the second adhesive layer includes a first face having an acrylic adhesive and a second face having a silicone adhesive.

In one form, the layers each include a respective perimeter. The glass layer perimeter extends beyond the perimeters of the other layers.

In one form, the protector compresses when an installing force is applied to adhere the protector to the camera bump, but does not compress so far as to allow an opposing surface of the glass to contact an opposing surface of a camera lens, and rebounds when the installing force is removed, resulting in the adhered protector having the opposing surface of the glass and the opposing surface of the camera lens to be less than 0.1 mm apart.

In one form, the lamination is 2.5 to 2.6 mm thick.

In one form, the optically clear adhesive has a peeling force greater than 500 g/25 mm.

In one form, the layers are coextensive.

In one form, at least one of the layers includes a receiver. The receiver receives at least a portion of a camera lens.

In one form, the glass layer does not include a receiver.

In one form, the lamination compresses and rebounds less than 0.1 mm when an application force is applied and removed.

In one form, at least one layer includes an opaque area surrounding the receiver.

In one form, the opaque area extends no less than 1 mm from an edge of the receiver.

In one form, the invention is directed to a protector for a camera of a portable electronic device. The protector is formed of a lamination of materials. The lamination includes a layer of impact absorbing optically clear material, a glass layer, a first layer of layer of optically clear adhesive, an acrylic layer, and a second layer of optically clear adhesive. The layers each include at least one aperture aligned to allow communication through the lamination from a first side to a second side, and further including light isolating means within at least one aperture of at least one layer.

In one form, the invention is directed to a protector for a camera of a portable electronic device. The protector is formed of a lamination of materials. The lamination includes a layer of impact absorbing optically clear material, a glass layer, a first adhesive means for adhering the glass layer to an underlying layer, an acrylic layer, and a second adhesive means for adhering the lamination to at least a portion of the camera of the portable electronic device, receiver means for receiving at least a portion of a camera lens, aperture means for providing a path for light from a camera flash and further including light isolating means within the aperture means.

In one form, the lamination is within 0.1 mm of a camera lens optical surface, but not touching the optical surface.

In one form, the protector compresses less than 0.1 mm when an installation force is applied, and rebounds less than 0.1 mm when the installation force is removed and the protector is fixed on the camera.

BRIEF DESCRIPTION OF THE DRAWINGS

FIG. 4 is a cross-sectional bottom perspective view of a protector of the present invention.

FIG. 5 is a side elevational view of a protector of the present invention.

FIG. 6 is a closeup side elevational view of the lamination layers of a protector of the present invention.

DETAILED DESCRIPTION OF THE PREFERRED EMBODIMENT

Figure 1:
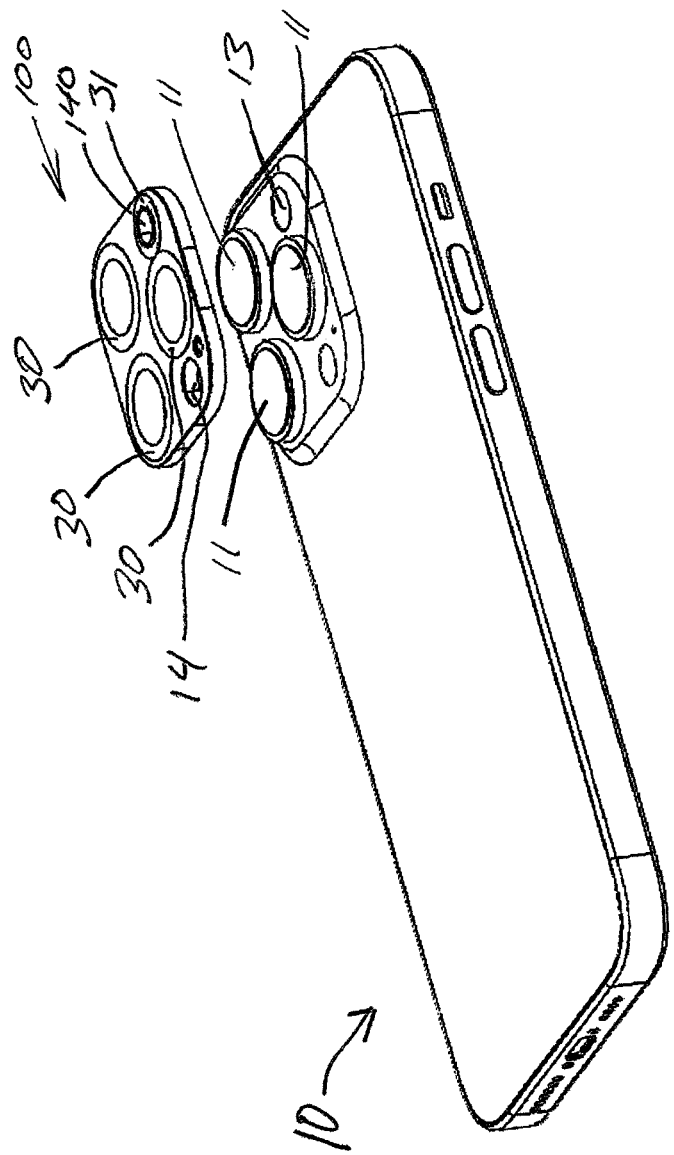
FIG. 1 is a perspective view of a laminated protector of the present invention in registration prior to placement upon the camera bump of a representative smartphone.
Figure 2:
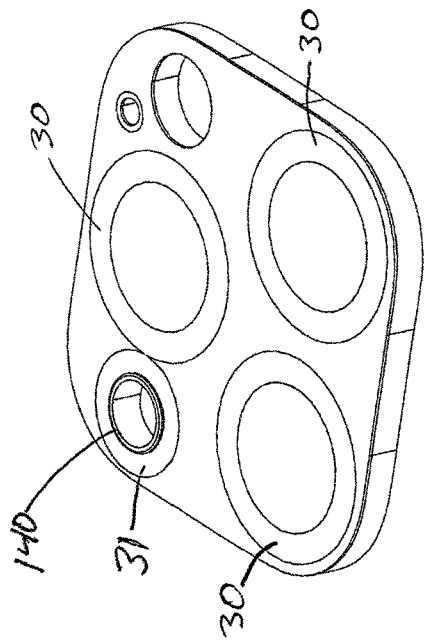
FIG. 2 is a top perspective view of a protector of the present invention.
Figure 3:
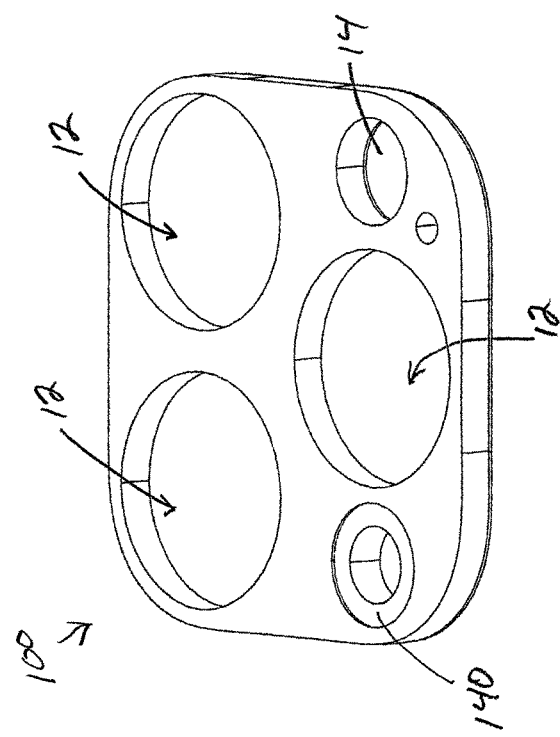
FIG. 3 is a bottom perspective view of a protector of the present invention.
Figure 7:
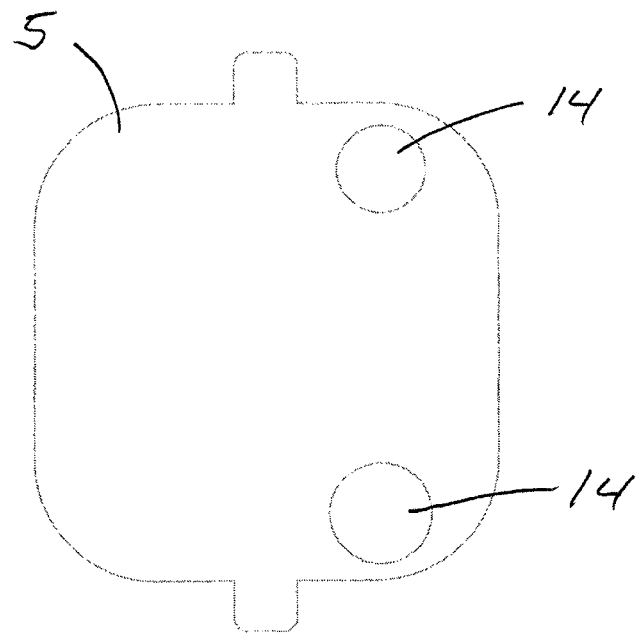
FIG. 7 is a top plan view of an exemplary polymer layer of a protector of the present invention.
Figure 8:
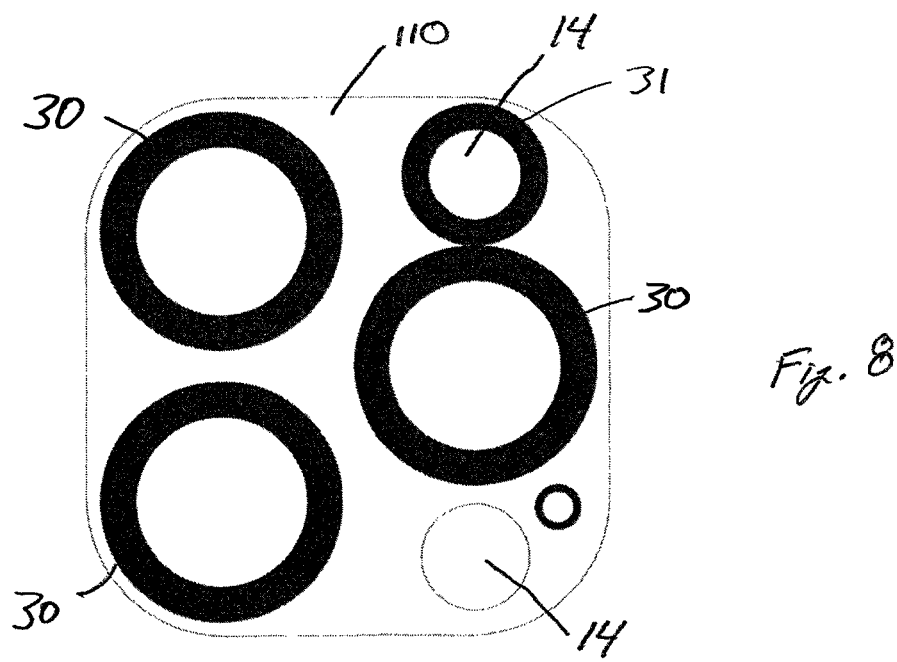
FIG. 8 is a top plan view of an exemplary glass layer of a protector of the present invention.
Figure 9:
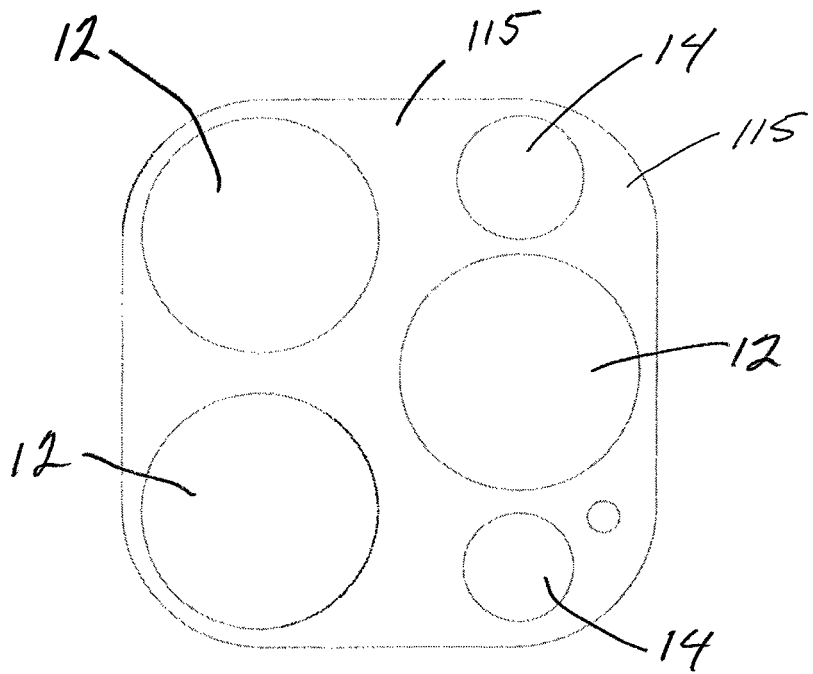
FIG. 9 is a top plan view of an exemplary first adhesive layer of a protector of the present invention.
Figure 10:
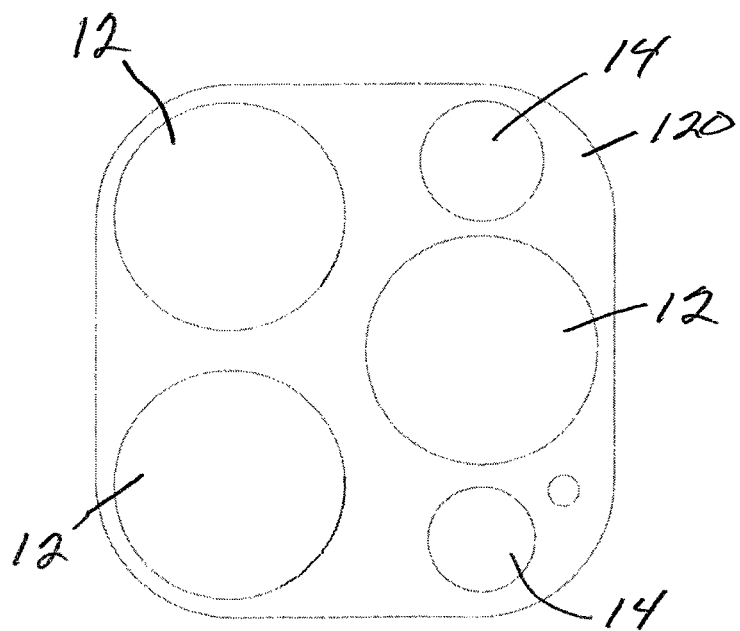
FIG. 10 is a top plan view of an exemplary acrylic layer of a protector of the present invention.
Figure 11:
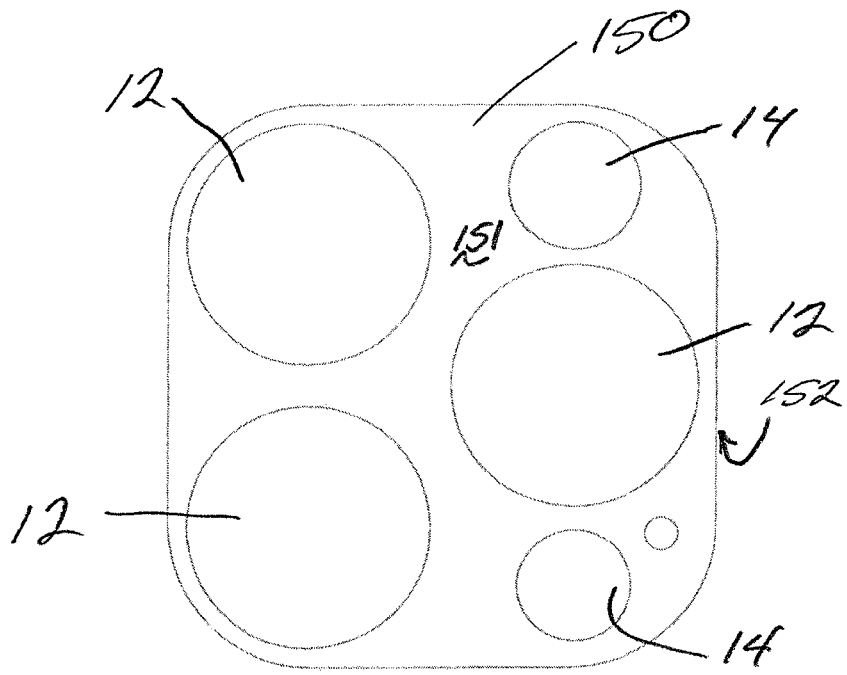
FIG. 11 is a top plan view of an exemplary second adhesive layer of a protector of the present invention.
Figure 12:
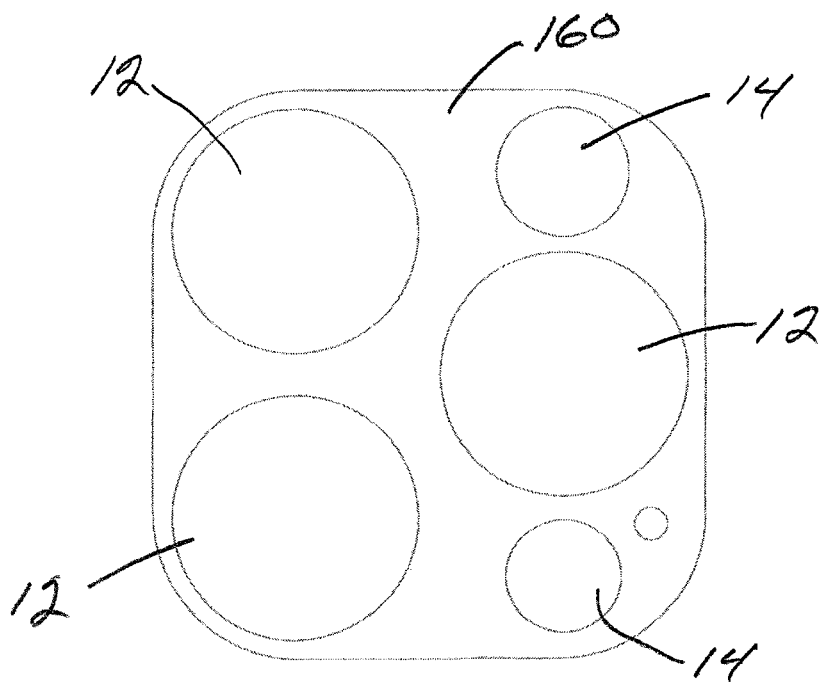
FIG. 12 is a top plan view of an exemplary third adhesive layer of a protector of the present invention.
Figure 14:
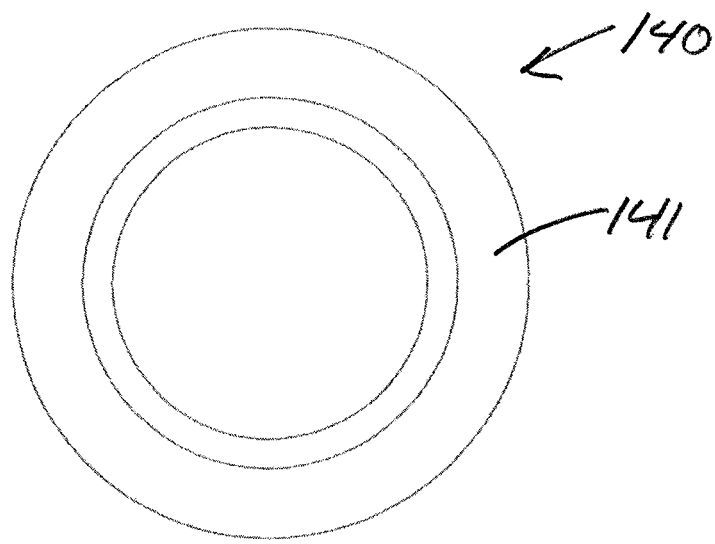
FIG. 14 is a top plan view of a light isolating insert of the present invention.
Figure 13:
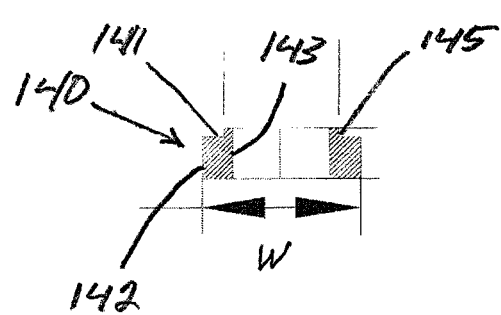
FIG. 13 is a side elevational view of a light isolating insert or ring of the present invention.
Figure 15:
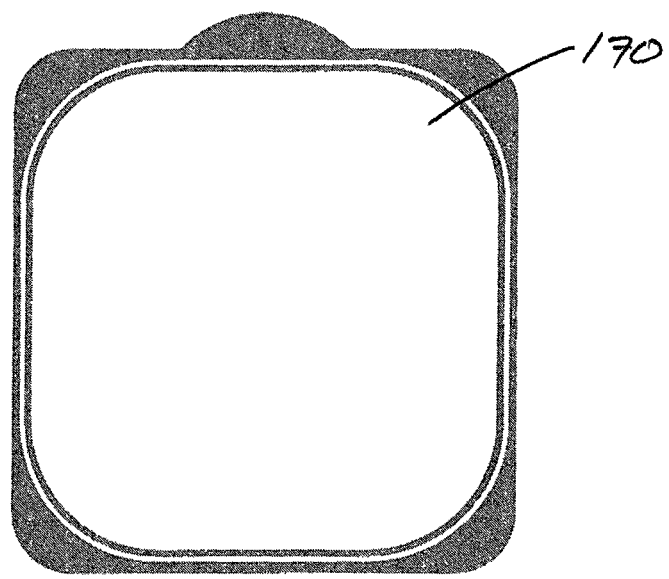
FIG. 15 is a top plan view of a release liner board used with the present invention.

With reference to the Figures, in one embodiment, the invention discloses a laminated protector 100 for a mobile electronic device 10 having a camera with a lens or lenses 11. The protector 100 may be generally flat, or it may be curved. The protector 100 may be shaped to conform with the surface of the mobile electronic device 10 to which it is attached. As used herein, the terms above and below reference directions with respect to the camera bump and the exterior environment. Eg., the protector 100 is positioned above the camera bump. Such positioning is shown in FIG. 1.

In some embodiments, the protector 100 includes receivers 12 to accept, receive, or fit over or about the lenses 11 of the portable electronic device 10. In some embodiments the receivers 12 do not go through all layers or laminations of the protector 100. In some embodiments, the receivers 12 are present in the laminations between the glass layer and the portable electronic device 100. In some embodiments, the receivers 12 are apertures.

Positioning of the receivers 12 about the camera lenses allows the glass layer and any layers above the glass layer to protect the underlaying lens of the camera. The receivers 12 can be a series of apertures in the individual laminated layers that are in alignment. In some embodiments the receivers are axially aligned apertures in select layers of the lamination of the protector 100.

In some embodiments, the protector 100 includes at least one aperture 14 that allows communication from the exterior facing surface of the protector 100 through to the surface of the protector that is mounted to the camera bump. The aperture 14 is present in all of the optical layers of the lamination and overlies the flash 12 of the camera. Thus the flash 12 is not covered by any of the layers of the lamination. Such positioning allows the flash to be fully exposed to the outside environment without being covered by any of the layers of the protector 100. One skilled in the art will recognize that the number of apertures 14 and receivers 12 as well as the placement or arrangement of those features will vary depending upon the number of lenses, sensors, flashes, and other features on the corresponding portable electronic device.

In some embodiments, the protector 100 is a laminate approximately 2.5 to 2.6 mm thick. The laminate may include a release liner 175 including a board 170 and third adhesive layer 160 as part of that thickness T. One skilled in the art will recognize that the release liner 175 would be removed when the protector 100 is applied to the portable electronic device, and thus the thickness of the protector when on the device may be less than the 2.5 to 2.6 measurement. One skilled in the art will recognize that the thickness of the protector is somewhat a function of the distance or height of the lens 11 assemblies of the camera are positioned above the surface of the portable electronic device 10. In some embodiments, the glass layer of the protector 100 is positioned less than or equal to 0.10 mm from the top surface of the lens 11. In some embodiments, the glass layer of the protector is in contact with the top surface of the lens 11.

In some embodiments the protector 100 may include a layer of polymer 5, plastic, or other impact absorbing optically clear material. This layer of polymer 5 may include an at least one aperture 14. The layer of polymer 5 is outward or exterior facing to provide protection and impact absorption. The layer of polymer is most preferentially PET, but may be other polymers that are optically clear and provide impact protection.

In some embodiments, the layer of polymer 5 does not include any cut-out or aperture forming a receiver 12 in the other layers of the protector as it is desirous for the layer of polymer 5 to be over the lenses of the portable electronic device to provide impact absorption. In some embodiments, the layer of polymer 5 may be omitted.

In the most preferred embodiment, the layer of polymer 5 is applied directly to or rests directly on the underlying glass layer 110. In the most preferred embodiment, the layer of polymer 5 is approximately 0.12 mm thick, but the thickness may vary.

The protector may include in some embodiments a glass layer 110. The glass layer 110 may be coextensive or nearly coextensive with the layer of polymer 5. One skilled in the art will recognize that such coextensiveness is not required. In some embodiments it is preferrable for the glass layer 110 to extend slightly beyond the other layers on the perimeter of the protector 100. In the most preferred embodiment, the glass layer 110 is 0.25 mm thick, but the thickness may vary.

The glass layer 110 may be tempered glass, Sapphire, rigid clear polymers, or other materials that are optically clear. In other embodiments, the glass layer 110 may include exterior coatings that improve oleophobicity, hydrophobicity, glare resistance, privacy films, etc. to enhance or add properties of material. Structures such a polarization gratings or louvers may also be present.

In some embodiments, the glass layer 110 does not include receivers 12, so that the glass layer 110 overlies and protects the lens 11 of the camera. In some embodiments the surfaces of the glass layer 110 may include receivers 12 to accept the lenses 11 of the portable electronic device. Such receivers 12 can be in axial registration with receivers 12 or cut-outs in the layers below.

The glass layer 110 may also include an at least one aperture 14 in axial registration with apertures in the layers above or below. The aperture 14 may overlie or be in registration with a flash or other lighting device or aspect of the portable electronic device camera.

In some embodiments, the glass layer 110 may include opaque areas 30 adjacent to the receivers 12 or cut-outs. In other embodiments where the glass layer 110 does not include receivers 12, the glass layer may still include opaque areas 30 in registration with the lenses of the camera. In such an embodiment, the opaque areas 30 may be within a vertical or axial extension of the bounds of the receivers 12, outside of a vertical or axial extension of the bounds of the receivers 12, or straddle a vertical or axial extension of the bounds of the receivers 12. The opaque areas 30 may be painted, infused, coated, etched or otherwise treated to reduce, limit, or eliminate light transmission. In some embodiments, similar opaque areas 31 may be adjacent to the aperture 14. The wall of the aperture 14 may also include similar opaque treatments to limit transmission of light from the flash into any of the layers. In some embodiments, the opaque areas 30 and 31 are annular or concentric about the perimeter of the receivers 12 or apertures 14. The opaque areas 30 and 31 are approximately 1 to 5 mm wide measured from the inner rim to outer rim of the areas, but one skilled in the art will recognize that the measurements may vary.

The glass layer 110, as with any of the layers, may be curved to conform to a curve of the portable electronic device 10. It is preferred that the glass 110 is curved by heat bending.

In some embodiments the protector 100 may include a layer of optically clear adhesive 115 disposed on the underside or inward facing surface 112 of the glass layer 110. One skilled in the art will recognize that inwardly facing describes the surface that faces the portable electronic device 10 when the protector 100 is on the device. In the most preferred embodiment, the optically clear adhesive 115 is CACS brand PET or acrylic adhesive, but other adhesives may be used. In the most preferred embodiment, the optically clear adhesive 115 is 0.22 mm thick, although the thickness may vary. The optically clear adhesive may have an peeling force of ≥500 g/25 mm using test method JIS-K-0237.

In some embodiments, the optically clear adhesive 115 is generally coextensive with the underlying acrylic layer 120. However, in some embodiments, the optically clear adhesive 115 may be applied only to select portions of the inward facing surface 112 of the glass layer 110, or to select portion of the acrylic layer 120. The optically clear adhesive 115 adheres the acrylic layer 120 to the inward facing surface 112 of the glass layer 110. One skilled in the art will recognize that the acrylic layer 120 may be made of some plastic or polymer material other than acrylic that have a low durometer when compared to the glass layer 110, or include a flexible elastomer.

In some embodiments the acrylic layer 120 is approximately 1.2 mm thick. The acrylic layer 120 may include receivers 12 or cut-outs axially aligned with receivers 12 or cutout in the layers below. The acrylic layer 120 may also include an aperture 14 in axial registration with apertures in the layers above or below.

In some embodiments, the diameter of the receivers 12 is larger than the diameter of the camera lens 12 it is to receive.

In some embodiments, a light isolating insert 140 is placed within an aperture 14. In some embodiments, the light isolating insert 140 may be made of PC, plastic, metal, or any opaque material. The light isolating insert 140 may be tubular to allow such transmission within its interior opening, but not through its walls 142 and 143. The word tubular is used herein to mean a structure having a passage or hollow within to allow communication from one side of the structure to the other, but not limited to being circular in cross section. For instance, if the aperture 14 is square rather than circular, the light isolating insert 140 may have square walls, but still be considered tubular. The inner 142 and outer 143 walls of the light isolating insert may be of different profiles or shapes or contours. It is most preferred for the light isolating insert 140 to not transmit any light from inside of the tube through the walls 142 and 143 of the tube. The light isolating insert 140 may have any shape that is convenient.

The light isolating insert may extend above the top most layer of the protector 100 by approximately 0.10 mm. Such extension above the topmost surface of the protector eliminates or reduces flare from the flash 13 in the camera images by reducing the amount of flash light into the layers of the protector. In the most preferred embodiment, the light isolating insert 140 includes an inward flange 141. The inward flange 141 is in contact with the underside surface 111 of the glass layer 110. In other embodiments, the inward flange 141 is in contact with the underside surface of the layer of polymer 5. In any embodiment, it is preferred that the light isolating insert 140 extend above the outermost surface of the protector 100. The light isolating insert 140 may have a width W that is slightly smaller that the width of the receiver 12 in which it is placed.

In some embodiments a second adhesive layer 150 that is optically clear is under the acrylic layer 120. The second adhesive layer 150 is preferably 0.25 mm thick, but the thickness may vary. The second adhesive layer 150 may include receivers 12 or cut-outs axially aligned with receivers 12 or cutout in the layers below. The glass second adhesive layer 150 may also include an aperture 14 in axial registration with apertures in the layers above or below. As with any of the adhesive layers, the layer need not be continuous or coextensive with any of the adjacent layers. The second adhesive layer 150 may be of the same adhesive as the first adhesive layer 115, or a different adhesive. Examples of an adhesive for the second layer are an adhesive with a silicone adhesive on one face 152 of the layer, and an acrylic or PET adhesive on a second face 151. Examples of such an adhesive are made by CACS brand. The face with the silicone adhesive is preferably under the acrylic or PET adhesive. The second face adhesive may have and peeling force≥1000 g/25 mm using test method JIS-K-0237. The first face silicone adhesive may have a peeling force of 800 g±400 g/25 mm using test method JIS-K-0237.

In some embodiments a third adhesive layer 160 that is optically clear is under the second adhesive layer 150. However the third adhesive layer 160 need not he optically clear as it is removed with the release liner 170 The third adhesive layer 160 is preferably 0.12 mm thick, but the thickness may vary. The third adhesive layer 160 may include receivers 12 or cut-outs axially aligned with receivers 12 or cutout in the layers above or below. In some embodiments, the diameter of the receivers 12 is larger than the diameter of the camera lens 12 it is to receive. The third adhesive layer 160 may also include an aperture 14 in axial registration with apertures in the layers above or below. As with any of the adhesive layers, the layer need not be continuous or coextensive with any of the adjacent layers. The third adhesive layer 150 may be of the same adhesive as the first adhesive layer 115, or a different adhesive. It is most preferably different than the second adhesive layer 150 so as to allow separation of the protector 100 from the portable electronic device when removal is desired.

In some embodiments, a board 170 or backing is placed on the third adhesive layer to prevent the adhesive form sticking to objects prior to the installation of the screen protector 100 onto a device. The board 170 may include apertures 14 and receivers 12 or cut-outs. The board 170 and third adhesive collectively may be considered the release liner 175. The overall thickness T of the lamination may include the release liner 175, but the release liner 175 is not placed onto the phone.

One skilled in the art will recognize that the layers described herein may be laid-up in different combinations. It is also noted that the figures show materials for illustrative purposes. The foregoing disclosure of specific embodiments is intended to be illustrative of the broad concepts comprehended by the invention.

The invention claimed is:

1. A protector for a camera of a portable electronic device, the protector including a lamination of a plurality of layers, the layers including a layer of impact absorbing optically clear material, a glass layer, a first layer of optically clear adhesive, an acrylic layer, and a second layer of optically clear adhesive, the layers each including at least one aperture aligned to allow communication through the lamination from a first side to a second side, and further including at least one light isolating member within at least one aperture of at least one layer, wherein the layers each include a respective perimeter, the glass layer perimeter extending beyond the perimeters of the other layers.

2. A protector for a camera of a portable electronic device, the protector including a lamination of a plurality of layers, the layers including a layer of impact absorbing optically clear material, a glass layer, a first layer of optically clear adhesive, an acrylic layer, and a second layer of optically clear adhesive, the layers each including at least one aperture aligned to allow communication through the lamination from a first side to a second side, and further including at least one light isolating member within at least one aperture of at least one layer, wherein the protector compresses when an installing force is applied to adhere the protector to the camera bump, but does not compress so far as to allow an opposing surface of the glass to contact an opposing surface of a camera lens, and rebounds when the installing force is removed resulting in the adhered protector having the opposing surface of the glass and the opposing surface of the camera lens to be less than 0.1 mm apart.

3. The protector of claim 2, wherein the light isolating member is an insert within an aperture.

4. The protector of claim 3, wherein the insert is in the aperture of each layer.

5. The protector of claim 3, wherein the insert extends above the impact absorbing optically clear layer by 0.1 mm.

6. The protector of claim 3 wherein the insert includes an inwardly extending flange.

7. The protector of claim 2 wherein the second adhesive layer includes a first face having an acrylic adhesive, and a second face having a silicone adhesive.

8. The protector of claim 2 wherein the lamination is 2.5 to 2.6 mm thick.

9. The protector of claim 2 wherein the optically clear adhesive has a peeling force greater than 500 g/25 mm.

10. The protector of claim 2 wherein the layers are coextensive.

11. A protector for a camera of a portable electronic device, the protector including a lamination of a plurality of layers, the layers including a layer of impact absorbing optically clear material, a glass layer, a first layer of layer of optically clear adhesive, an acrylic layer, and a second layer of optically clear adhesive, the layers each including at least one aperture aligned to allow communication through the lamination from a first side to a second side, and further including at least one light isolating member within at least one aperture of at least one layer, at least one of the layers includes a receiver, the receiver receiving at least a portion of a camera lens, wherein the glass layer does not include a receiver.

12. The protector of claim 11, wherein the lamination compresses and rebounds less than 0.1 mm when an application force is applied and removed.

13. The protector of claim 11, wherein at least one layer includes an opaque area surrounding the receiver.

14. The protector of claim 13, wherein the opaque area extends no less than 1 mm from an edge of the receiver.

15. A protector for a camera of a portable electronic device, the protector being formed of a lamination of materials, the lamination including a layer of impact absorbing optically clear material, a glass layer, a first adhesive means for adhering the glass layer to an underlying layer, an acrylic layer, and a second adhesive means for adhering the lamination to at least a portion of the camera of the portable electronic device, receiver means for receiving at least a portion of a camera lens, aperture means for providing a path for light from a camera flash and further including light isolating means within the aperture means, wherein the lamination is within 0.1 mm of a camera lens optical surface, but not touching the optical surface.

16. A protector for a camera of a portable electronic device, the protector being formed of a lamination of materials, the lamination including a layer of impact absorbing optically clear material, a glass layer, a first adhesive means for adhering the glass layer to an underlying layer, an acrylic layer, and a second adhesive means for adhering the lamination to at least a portion of the camera of the portable electronic device, receiver means for receiving at least a portion of a camera lens, aperture means for providing a path for light from a camera flash and further including light isolating means within the aperture means, wherein the protector compresses less than 0.1 mm when an installation force is applied, and rebounds less than 0.1 mm when the installation force is removed and the protector is fixed on the camera.

* * * * *